(12) United States Patent
Mancuso et al.

(10) Patent No.: US 12,373,492 B2
(45) Date of Patent: Jul. 29, 2025

(54) GENERATING AND PROVIDING CONTENT STACKS UTILIZING MACHINE-LEARNING MODELS

(71) Applicant: Dropbox, Inc., San Francisco, CA (US)

(72) Inventors: Devin Mancuso, San Francisco, CA (US); Jason Stakelon, Sausalito, CA (US); Richard Chan, San Francisco, CA (US); Fiona Rolander, Reno, NV (US); Walter Somerville, Brooklyn, NY (US)

(73) Assignee: Dropbox, Inc., San Francisco, CA (US)

( * ) Notice: Subject to any disclaimer, the term of this patent is extended or adjusted under 35 U.S.C. 154(b) by 97 days.

(21) Appl. No.: 18/344,041

(22) Filed: Jun. 29, 2023

(65) Prior Publication Data

US 2024/0403366 A1 Dec. 5, 2024

Related U.S. Application Data

(60) Provisional application No. 63/505,970, filed on Jun. 2, 2023.

(51) Int. Cl.
*G06F 16/00* (2019.01)
*G06F 16/28* (2019.01)
(Continued)

(52) U.S. Cl.
CPC ........ *G06F 16/9024* (2019.01); *G06F 16/288* (2019.01); *G06F 16/9535* (2019.01)

(58) Field of Classification Search
None
See application file for complete search history.

(56) References Cited

U.S. PATENT DOCUMENTS 11,562,014 B1  1/2023  Dermu
11,657,147 B1 * 5/2023  Ni .......................... G06F 21/561
                                                          726/23

(Continued)

OTHER PUBLICATIONS

Huang Z., et al., "A Graph Model for E-Commerce Recommender Systems," Journal of the American Society for Information Science and Technology, Nov. 14, 2003 [Published Online], vol. 55, No. 3, pp. 259-274, DOI: 10.1002/asi.10372.

(Continued)

*Primary Examiner* — Tuankhanh D Phan
(74) *Attorney, Agent, or Firm* — Keller Preece PLLC

(57) ABSTRACT

The present disclosure relates to systems, non-transitory computer-readable media, and methods for generating a content stack utilizing one or more machine-learning models. In some implementations, the disclosed systems generate and provide, to a user account, a content stack that includes content items corresponding to a topic prompt for the user account. For instance, in some implementations, the disclosed systems utilize content-based signals and account-based signals to generate an account-specific stack formulation graph that represents a plurality of content items and relationships of the content items with each other and with the user account. Additionally, in some implementations, the disclosed systems analyze the account-specific stack formulation graph to generate a content stack from the plurality of content items, the content stack comprising a set of content items corresponding to the topic prompt.

20 Claims, 10 Drawing Sheets

(51) Int. Cl.
*G06F 16/901* (2019.01)
*G06F 16/9535* (2019.01)

(56) References Cited

U.S. PATENT DOCUMENTS

| | | |
|---|---|---|
| 2014/0089322 A1 | 3/2014 | Garcia et al. |
| 2017/0091628 A1 | 3/2017 | Nachman et al. |
| 2017/0346781 A1 | 11/2017 | Birney et al. |
| 2018/0101774 A1 | 4/2018 | Werris |
| 2018/0157662 A1 | 6/2018 | Chin et al. |
| 2020/0159761 A1 | 5/2020 | Mennicken et al. |
| 2020/0311120 A1 | 10/2020 | Zhao et al. |
| 2021/0073292 A1* | 3/2021 | Murray ............... G06F 16/9024 |
| 2021/0240749 A1 | 8/2021 | Epstein |
| 2021/0326720 A1 | 10/2021 | Riemenschneider et al. |
| 2022/0155924 A1 | 5/2022 | Campbell et al. |
| 2022/0284501 A1 | 9/2022 | Johnson et al. |
| 2022/0318307 A1 | 10/2022 | Leskovec et al. |
| 2022/0318309 A1 | 10/2022 | Slovak |
| 2023/0251862 A1* | 8/2023 | Kumar ............... G06F 12/1009 |

OTHER PUBLICATIONS

International Search Report and Written Opinion for Application No. PCT/US2024/017542, mailed on Jun. 6, 2024, 12 pages.

Hazimeh H., et al., "Automatic Embedding of Social Network Profile Links into Knowledge Graphs," In Proceedings of the 9th International Symposium on Information and Communication Technology (SoICT), Dec. 6-7, 2018, pp. 16-23.

Lin D., et al., "PlatoGL: Effective and Scalable Deep Graph Learning System for Graph-enhanced Real-Time Recommendation," In Proceedings of the 31st ACM International Conference on Information and Knowledge Management (CIKM '22), Oct. 17-22, 2022, pp. 3302-3311.

* cited by examiner

GENERATING AND PROVIDING CONTENT STACKS UTILIZING MACHINE-LEARNING MODELS

RELATED APPLICATIONS

This application claims priority to and the benefit of U.S. Provisional Patent Application No. 63/505,970, filed on Jun. 2, 2023 and titled "GENERATING AND PROVIDING CONTENT STACKS UTILIZING MACHINE-LEARNING MODELS," which is hereby incorporated herein by reference in its entirety.

BACKGROUND

Advancements in computing devices and networking technology have given rise to a variety of innovations in cloud-based digital content storage and access. For example, online digital content systems can provide access to digital content items across devices all over the world. Existing systems can also synchronize changes to shared digital content across different types of devices operating on different platforms. Indeed, modern online digital content systems can provide access to digital content for users to collaborate across diverse physical locations and over a variety of computing devices. Despite these advances, however, existing digital content systems continue to suffer from a number of disadvantages, particularly in terms of flexibility and efficiency.

As just suggested, some existing digital content systems are inflexible. In particular, many existing systems are rigidly fixed to the conventional paradigm of providing access to content items using files and folders which are navigable via interaction with client devices. For example, some existing systems provide access to stored content items via drill-down navigation within a hierarchy of folders and/or via a search function to locate a directory for a searched content item. To access other types of content items, such as websites or other web-based content items not stored on a client device (and not stored in another folder directory on a cloud server for a user account), existing systems often require the use of an entirely separate application (e.g., apart from a folder/file management application). Indeed, to provide access to web-based content items and stored content items, existing systems can require separate computer applications (e.g., a browser application and a file management application), even for accessing content items of a common topic. Beyond this, should user accounts engage in communication regarding one or more content items and/or editing (or otherwise interacting with) the content items, many existing systems require further separate applications to facilitate such communication and editing (or other interaction).

Due at least in part to their inflexibility, many existing digital content systems are also inefficient. To elaborate, many existing systems consume excessive amounts of computer resources, such as processing power and memory, by running separate applications for accessing stored content items, accessing web-based content items, and communicating between client devices. In addition, some existing systems provide inefficient user interfaces that require many navigational operations performed via client devices to access desired content and/or functionality. For example, existing systems often require many drill-down operations to navigate folders to access a content item. Even for systems that facilitate faster content item access through searching, such systems nevertheless require many navigational operations across different interfaces and applications to access content items of different types, to communicate across client devices regarding the content items, and/or to edit (or otherwise interact with) the content items.

Thus, there are several disadvantages with regard to existing digital content systems.

BRIEF SUMMARY

Embodiments of the present disclosure provide benefits and/or solve one or more of the foregoing or other problems in the art with systems, non-transitory computer-readable media, and methods for generating content stacks utilizing machine-learning models. In some implementations, the disclosed systems generate a stack formulation graph representing relationships among digital content items and user accounts in a content management system. Utilizing the stack formulation graph, in some implementations, the disclosed systems generate a content stack and propose the content stack to a user account as a collection of content that is likely relevant to the user account (e.g., for a particular task, meeting, project, etc.). For example, in some embodiments, the disclosed systems generate an account-specific stack formulation graph based on signals indicating relationships of a user account with content items and relationships of the content items with each other. In some implementations, the disclosed systems determine topic features for the content items and compare the topic features with a topic prompt associated with the user account. Using comparison metrics, in some embodiments, the disclosed systems select a set of content items that are pertinent to a task or workflow associated with the user account. The disclosed systems, in some cases, provide the set of content items to the user account in a content stack.

The following description sets forth additional features and advantages of one or more embodiments of the disclosed methods, non-transitory computer-readable media, and systems. In some cases, such features and advantages are evident to a skilled artisan having the benefit of this disclosure, or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
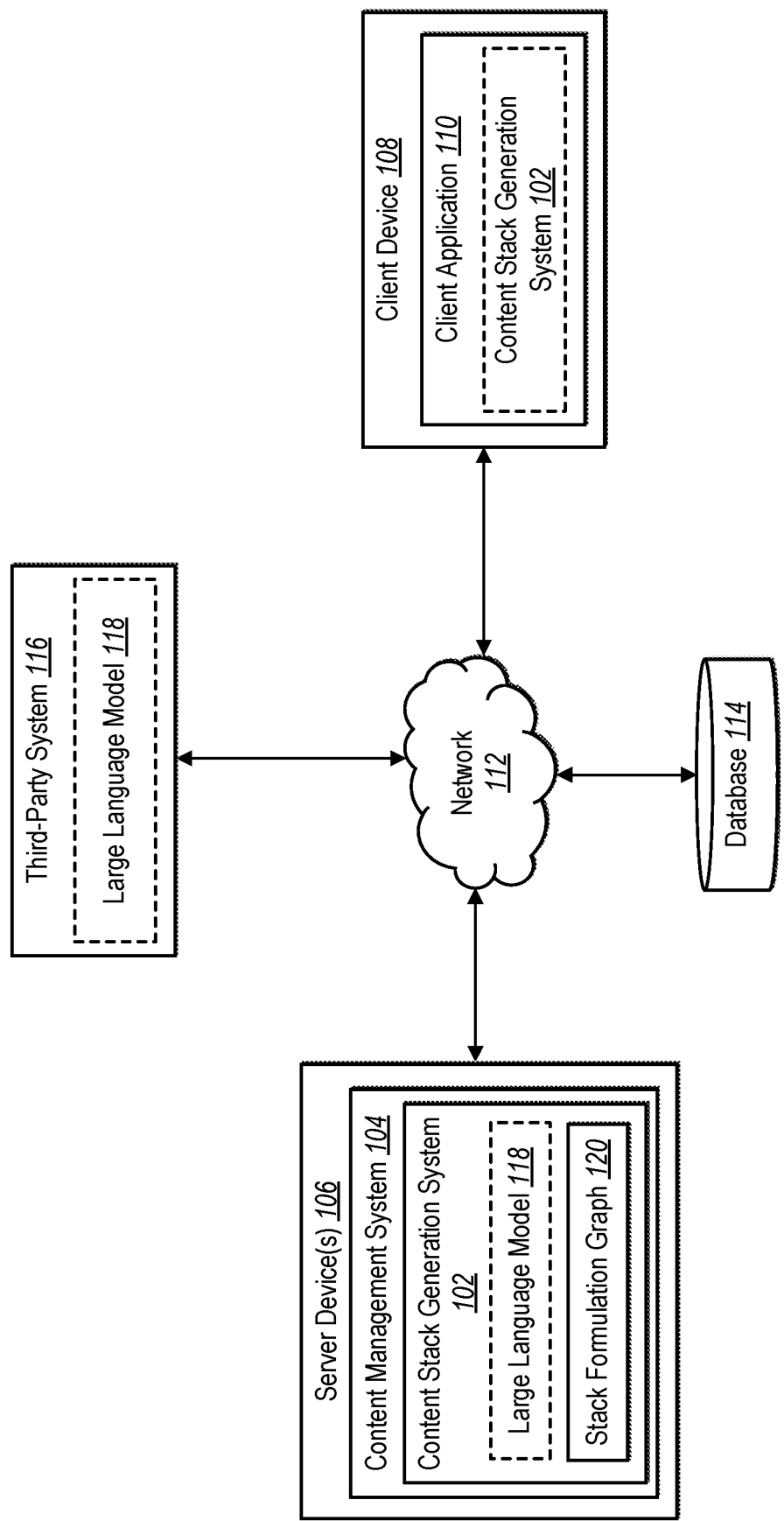
FIG. 1 illustrates an example diagram of an environment in which a content stack generation system operates in accordance with one or more embodiments.

This disclosure describes one or more implementations of a content stack generation system that can determine a set of content items relevant to a user account and provide the set of content items to the user account as a content stack. In particular, in some implementations, the content stack generation system generates a stack formulation graph representing relationships among digital content items and user accounts in a content management system. The content stack generation system can utilize the stack formulation graph to generate a content stack and propose the content stack to the user account as a collection of content that is likely relevant to a particular need of the user account. For example, in some embodiments, the content stack generation system generates an account-specific stack formulation graph based on signals indicating relationships of the user account with content items and relationships of the content items with each other. In some implementations, the content stack generation system determines topic features for the content items and compares the topic features with a topic prompt associated with the user account. Using comparison metrics, the content stack generation system can select a set of content items that are pertinent to a task, project, question, meeting, workflow, or other need of the user account.

In particular, the content stack generation system can provide content stacks containing content items that assist a user account with a variety of activities, such as prioritizing work, sharing projects, authoring documents, retrieving answers and other content, summarizing communications, and orchestrating computing applications. To illustrate, in some implementations, the content stack generation system ingests content items from various sources (e.g., a database of files, an email application, a calendar, a messaging application, the Internet, etc.). The content stack generation system can extract the content items into unary features and/or binary relationships, and embed the unary features and/or binary relationships into a latent vector space, thereby generating feature vectors for the content items (e.g., topic features as described below). The content stack generation system can determine distances between the feature vectors and group the content items into clusters of topics. Additionally, the content stack generation system can determine distances between the feature vectors and current needs of the user account (e.g., topic prompts as described below). Based on the topic clusters for the content items and/or the distances from user account needs, the content stack generation system can provide contextual recommendations of content to the user account (e.g., content stacks as described below).

The content stack generation system can group content items into content stacks based on a variety of properties of the content items and of the user account, such as a title, URL, or content of a webpage, and/or navigational patterns of the user account with respect to the webpage (e.g., previous visits to the page, time spent on the page, whether the user account switched back and forth to the page, whether the user account is currently on the page, whether the user account came to the page from another relevant webpage, etc.). Additionally, the content stack generation system can group content items based on a description of a meeting and/or relationships of the user account with other user accounts in the meeting. In some cases, the content stack generation system groups content items for a user account based primarily on account data of other user accounts. For example, if a user account is a new user account, the content stack generation system can provide relevant content items to the user account based on relationships of the user account with other user accounts (e.g., a supervising account and/or other accounts within a team), notwithstanding the new user account has not yet developed account activity in relation to the content items.

The content stack generation system provides a variety of technical advantages relative to existing digital content systems. For example, the content stack generation system can improve flexibility over prior systems. Indeed, while some prior systems are rigidly fixed to the traditional folder-and-file hierarchy for accessing content items, the content stack generation system can utilize a stack formulation graph and a large language model to adaptively access and provide content items from a wide range of locations, including locally stored content items and content items hosted on a server (e.g., a website or a cloud-stored content item). Even compared to existing systems that can access different types of content items, such as websites and stored content items, the content stack generation system can increase flexibility as the content stack generation system is able to provide access to content items from web locations and other server locations (by utilizing a large language model to analyze a stack formulation graph) without requiring entirely separate applications to access web-based content items than those for accessing stored content items (stored locally or on the cloud). Moreover, in cases where user accounts engage in communication regarding one or more content items and/or engage in editing (or otherwise interacting with) the content items, the content stack generation system integrates external applications such as web browsers, chat applications, and email clients directly within a common user interface to facilitate interaction with (or about) the content items, unlike many existing systems which require separate applications to facilitate such interaction.

Due at least in part to its improved flexibility, the content stack generation system can also improve efficiency over existing digital content systems. For example, in contrast with prior systems that consume excessive amounts of computer resources (such as processing power, storage space, and memory) by running separate applications for accessing stored content items, accessing web-based content items, and communicating between client devices, the content stack generation system can condense many functions into a single application and a single interface. For example, the content stack generation system can embed multiple external applications directly within a single user interface, thereby reducing the navigational burden of prior systems that require many navigational operations across different interfaces and applications. In addition, the content stack generation system reduces the number of drill-down operations to access a content item by providing content stacks for directly accessing relevant content items (e.g., with a single click or a single text query). Consequently, the content stack generation system not only improves navigational efficiency but also improves computational efficiency by reducing the computing resources required to run many different applications at once.

Moreover, the content stack generation system can improve the efficiency of computer storage usage. In particular, the content stack generation system can provide content stacks as a set of links to content items, which allows a user to interact with the content items in a content stack as if they were stored together, when the actual content items may be stored in various locations within a content management system (e.g., various different folders). Because the content stack generation system provides content stacks as sets of links, the content stack generation system can provide a seamless user experience while it also reduces or minimizes computer storage needed for content items because only a single copy of a particular content item is needed to be stored to allow the content stack generation system to include a link to the particular content item within multiple different content stacks (as opposed to creating multiple different copies of the same content item to store in multiple different folders).

As illustrated by the foregoing discussion, the present disclosure utilizes a variety of terms to describe features and advantages of the content stack generation system. Additional detail is hereafter provided regarding the meaning of these terms as used in this disclosure. For example, as used herein, the term "digital content item" (or "content item") refers to a digital object or a digital file that includes information interpretable by a computing device (e.g., a client device) to present information to a user. A content item can include a file or a folder such as a digital text file, a digital image file, a digital audio file, a webpage, a website, a digital video file, a web file, a link, a hyperlinked video file streamable from a webpage, a calendar event, a contact card, a text message thread, a direct message thread, a chat group thread, a social media feed, a social media post, a news article, a headline, a technical support ticket, a digital document file, or some other type of file or digital object. A content item can have a particular file type or file format, which may differ for different types of content items (e.g., digital documents, digital images, digital videos, or digital audio files). In some cases, a content item can refer to a remotely stored (e.g., cloud-based) item or a link (e.g., a link or reference to a cloud-based content item or a web-based content item). A content item can include a content clip that indicates, links, and/or references a discrete selection or segmented sub-portion of content from a larger content item. For example, a content item can be a clipped portion of a webpage, audio recording transcript, videoconference recording transcript, or other content item or source. A content item can be editable or otherwise modifiable and can also be sharable from one user account (or client device) to another. In some cases, a content item is modifiable by multiple user accounts (or client devices) simultaneously and/or at different times. Additionally, a content item can include metadata associated with another content item.

As a subset of content items, a "web content item" or a "web-based content item" refers to a content item accessible via the Internet, such a webpage, a website, or a cloud-based content item not accessed locally. For example, a web content item can refer to an internet-based content item, such as a content item identified by, or located at, a URL address. A web content item can include a content item coded or defined by HTML, JavaScript, or another internet language. In some cases, a web content item can include a content item accessible via HTTP(S) protocol (or some other internet protocol) via a web browser.

As used herein, the term "machine-learning model" refers to a computer representation that is tunable (e.g., trained) based on inputs to approximate unknown functions used for generating corresponding outputs. In particular, a machine-learning model can include a computer-implemented model that utilizes algorithms to learn from, and make predictions on, known data by analyzing the known data to learn to generate outputs that reflect patterns and attributes of the known data. For instance, a machine-learning model can include, but is not limited to, a neural network (e.g., a convolutional neural network, recurrent neural network, or other deep learning network), a decision tree (e.g., a gradient boosted decision tree), association rule learning, inductive logic programming, support vector learning, Bayesian networks, a regression-based model (e.g., censored regression), principal component analysis, or a combination thereof. In some embodiments, the content stack generation system utilizes a large language machine-learning model in the form of a neural network.

Similarly, as used herein, the term "neural network" refers to a machine-learning model that can be trained and/or tuned based on inputs to determine classifications and/or scores, or to approximate unknown functions. For example, a neural network can include a model of interconnected artificial neurons (e.g., organized in layers) that communicate and learn to approximate complex functions and generate outputs based on inputs provided to the neural network. In some cases, a neural network refers to an algorithm (or set of algorithms) that implements deep learning techniques to model high-level abstractions in data. A neural network can include various layers such as an input layer, one or more hidden layers, and an output layer that each perform tasks for processing data. For example, a neural network can include a deep neural network, a convolutional neural network, a recurrent neural network (e.g., an LSTM), a graph neural network, or a generative adversarial neural network. Upon training, a neural network may become a large language model.

Relatedly, as used herein, the term "large language model" refers to a machine learning model trained to perform computer tasks to generate or identify content items in response to trigger events (e.g., user interactions, such as text queries and button selections). In particular, a large language model can be a neural network (e.g., a deep neural network) with many parameters trained on large quantities of data (e.g., unlabeled text) using a particular learning technique (e.g., self-supervised learning). For example, a large language model can include parameters trained to generate or identify content items based on various contextual data, including graph information from a stack formulation graph and/or historical user account behavior.

Additional detail regarding the content stack generation system will now be provided with reference to the figures. For example, FIG. 1 illustrates a schematic diagram of an example system environment for implementing a content stack generation system 102 in accordance with one or more implementations. An overview of the content stack generation system 102 is described in relation to FIG. 1. Thereafter, a more detailed description of the components and processes of the content stack generation system 102 is provided in relation to the subsequent figures.

As shown, the environment includes server device(s) 106, a client device 108, a database 114, a third-party system 116, and a network 112. Each of the components of the environment can communicate via the network 112, and the network 112 may be any suitable network over which computing devices can communicate. Example networks are discussed in more detail below in relation to FIGS. 9-10.

As mentioned above, the example environment includes client device 108. The client device 108 can be one of a variety of computing devices, including a smartphone, a tablet, a smart television, a desktop computer, a laptop computer, a virtual reality device, an augmented reality device, or another computing device as described in relation to FIGS. 9-10. The client device 108 can communicate with the server device(s) 106, the third-party system 116, and/or the database 114 via the network 112. For example, the client device 108 can receive user input from a user interacting with the client device 108 (e.g., via a client application 110) to, for instance, access, generate, modify, and/or share one or more content items, to collaborate with a co-user of a different client device, or to select a user interface element. In addition, the content stack generation system 102 on the server device(s) 106 can receive information relating to various interactions with content items and/or user interface elements based on the input received by the client device 108 (e.g., to access content items, interact with content blocks, or perform some other action).

As shown, the client device 108 can include a client application 110. In particular, the client application 110 may be a web application, a native application installed on the client device 108 (e.g., a mobile application, a desktop application, etc.), or a cloud-based application where all or part of the functionality is performed by the server device(s) 106. Based on instructions from the client application 110, the client device 108 can present or display information, including an interface for presenting content items (e.g., via embedded applications) from the content management system 104 or from other network locations.

As illustrated in FIG. 1, the example environment also includes the server device(s) 106. The server device(s) 106 may generate, track, store, process, receive, and/or transmit electronic data, such as digital content items, interface elements, interactions with digital content items, interactions with interface elements, and/or interactions between user accounts or client devices. For example, the server device(s) 106 may receive data from the client device 108 in the form of a topic prompt to perform a particular task or to generate or retrieve a particular content item. In addition, the server device(s) 106 can transmit data to the client device 108 in the form of an interface that includes a content item related to performing the requested task. Indeed, the server device(s) 106 can communicate with the client device 108 to send and/or receive data via the network 112. In some implementations, the server device(s) 106 comprises a distributed server where the server device(s) 106 includes a number of server devices distributed across the network 112 and located in different physical locations. The server device(s) 106 can comprise one or more content servers, application servers, communication servers, web-hosting servers, machine learning servers, and other types of servers.

As shown in FIG. 1, the server device(s) 106 can also include the content stack generation system 102 as part of a content management system 104. The content management system 104 can communicate with the client device 108 to perform various functions associated with the client application 110 such as managing user accounts, managing content collections, managing content items, and facilitating user interaction with the content collections and/or content items. Indeed, the content management system 104 can include a network-based smart cloud storage system to manage, store, and maintain content items and related data across numerous user accounts, including user accounts in collaboration with one another. In some embodiments, the content stack generation system 102 and/or the content management system 104 utilize the database 114 to store and access information such as digital content items.

As also illustrated in FIG. 1, the content stack generation system 102 can include a large language model 118 and a stack formulation graph 120. In particular, the content stack generation system 102 can utilize the large language model 118 that is integrated with (e.g., trained by data from) the content management system 104 and/or the stack formulation graph 120. For example, the stack formulation graph 120 can store or encode relationship information to define relationships between user accounts and content items within the content management system 104 (and/or housed at other server locations). From the stack formulation graph 120, the large language model 118 can generate or identify content items to provide to the client device 108 in response to a user interaction via an interface. For instance, the large language model 118 can generate a content stack for a user account most closely related to a topic prompt received from the client device 108, as determined via the stack formulation graph 120.

FIG. 1 further illustrates a third-party system 116. In particular, the third-party system 116 can host or house the large language model 118 (e.g., as an alternative to the server device(s) 106 hosting or housing the large language model 118) for access by the content stack generation system 102. For example, the third-party system 116 can include a server location hosting the large language model 118 that is external to the content stack generation system 102. In some cases, the third-party system 116 is external to the content stack generation system 102, but the content stack generation system 102 can nevertheless access and utilize the large language model 118 to generate or identify content items by analyzing the stack formulation graph 120 on the server device(s) 106.

Although FIG. 1 depicts the content stack generation system 102 located on the server device(s) 106, in some implementations, the content stack generation system 102 may be implemented by (e.g., located entirely, or in part, on) one or more other components of the environment. For example, the content stack generation system 102 may be implemented by the client device 108, and/or a third-party device. For example, the client device 108 can download all or part of the content stack generation system 102 for implementation independent of, or together with, the server device(s) 106.

In some implementations, the environment may have a different arrangement of components and/or may have a different number or set of components altogether. For example, the client device 108 may communicate directly with the content stack generation system 102 on the server device(s) 106, bypassing the network 112. As another example, the environment can include the database 114 located external to the server device(s) 106 (e.g., in communication via the network 112) or located on the server device(s) 106, on the third-party system 116, and/or on the client device 108.

As discussed, in some implementations, the content stack generation system 102 determines relevant content items for a user account and generates a content stack containing the relevant content items. For instance, FIG. 2 illustrates the content stack generation system 102 communicating with a user account and generating a content stack for the user account in accordance with one or more embodiments.

Figure 2:
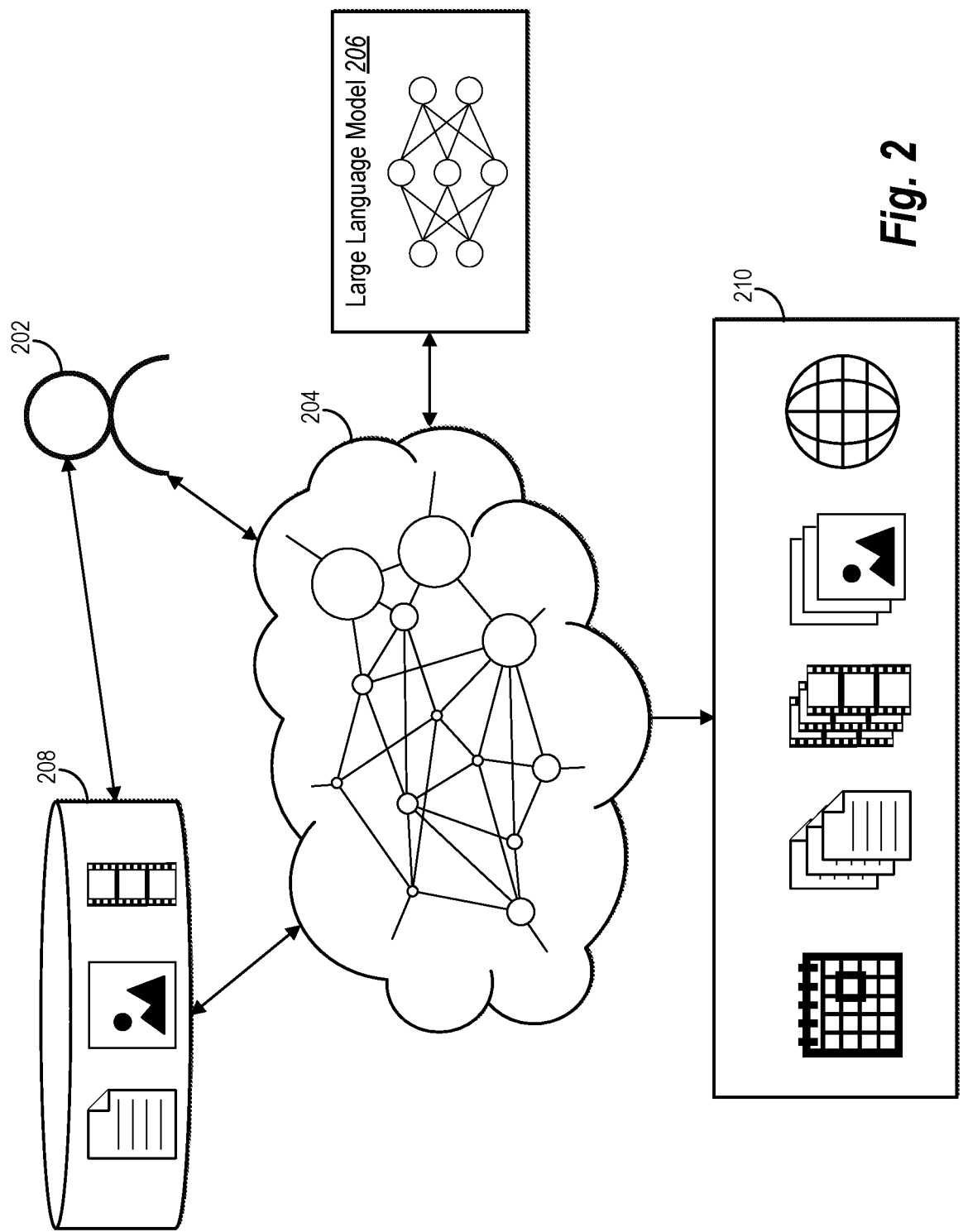
FIG. 2 illustrates an example diagram of the content stack generation system generating a content stack in accordance with one or more embodiments.

In particular, FIG. 2 shows the content stack generation system 102 identifying a user account 202. In some embodiments, the content stack generation system 102 determines account profile data and/or account activity data of the user account 202. For example, the content stack generation system 102 can identify recent activity data such as web browser history, file accesses, and communications (e.g., email, text message, group chat) with other user accounts to determine current interests, tasks, workflows, projects, and/or data needs of the user account 202. As described in additional detail below, the content stack generation system 102 can utilize the account profile data and/or account activity data to determine data needs (e.g., in the form of a topic prompt) for the user account 202.

As mentioned, in some implementations, the content stack generation system 102 generates and/or utilizes a stack formulation graph to define relationships between content items and user accounts. For example, in some embodiments, the content stack generation system 102 generates an account-specific stack formulation graph 204 (e.g., specific to the user account 202) comprising nodes and edges. To illustrate, the content stack generation system 102 identifies a body of content items (e.g., including all content items in the content management system 104, or including a subset of content items in the content management system 104 that are close to the user account 202 in a larger stack formulation graph) and a group of user accounts associated with the user account 202. For each content item associated with the user account 202, the content stack generation system 102 generates a node that represents the content item. Additionally, for each user account associated with the user account 202, the content stack generation system 102 generates a node that represents the user account.

To further illustrate, in some implementations, the content stack generation system 102 connects the nodes of the stack formulation graph 204 with edges (e.g., a connecting line between two nodes) that each represent a relationship between two content items, between two user accounts, or between a content item and a user account. Typically, an edge with a short length indicates a close relationship between nodes. For example, a short edge length between two nodes can indicate that two content items (represented by the nodes) are similar or otherwise related (e.g., authored by the same user account, viewed by the same user account, stored in a common folder, etc.). As another example, a short edge length between two nodes can indicate that two user accounts (represented by the nodes) frequently communicate with each other and/or are similarly situated in an organizational ontology. Still another example, a short edge length between two nodes can indicate that a content item (represented by one node) has been created by, modified by, shared by, accessed by, and/or is likely to be accessed by a user account (represented by the other node).

As mentioned, in some embodiments, the content stack generation system 102 utilizes a large language model to analyze the relationships defined in a stack formulation graph. For instance, the content stack generation system 102 utilizes a large language model 206 to associate nodes of the stack formulation graph 204 with topic features, and to determine a subset of nodes of the stack formulation graph 204 that are relevant to a topic prompt. As described further below, the content stack generation system 102 can utilize the large language model 206 to generate embedded representations of content items in a latent feature vector space representing various content topics. Furthermore, the content stack generation system 102 can utilize the large language model 206 to group content items according to topic features to facilitate accurate content stack suggestions based on topic prompts.

As also mentioned, in some implementations, the content stack generation system 102 accesses a database (e.g., the database 114, data storage on the server device(s) 106, data storage on the client device 108, etc.) containing content items. For example, the content stack generation system 102 accesses database 208 to identify, retrieve, and/or store content items relevant to a topic prompt corresponding with the user account 202. In some embodiments, the content stack generation system 102 accesses multiple databases to identify, retrieve, and/or store content items. In some cases, the content stack generation system 102 generates new content items and adds the new content items to the database 208. Additionally, as noted above, the content stack generation system 102 can access web-based content items through the Internet.

As discussed above and in further detail below, in some embodiments, the content stack generation system 102 generates one or more content stacks to provide to a user account. For instance, the content stack generation system 102 generates a content stack 210. As illustrated in FIG. 2, the content stack 210 can include several content items of a variety of content types, such as calendar items, digital documents, digital videos, digital images, webpages, and/or other content item types. To illustrate, the content stack generation system 102 identifies nodes in the stack formulation graph 204 that are closely related to a topic prompt for the user account 202. For instance, the content stack generation system 102 identifies a topic prompt based on recent activity of the user account 202 and/or user inputs from the user account 202, and locates a set of nodes in the stack formulation graph 204 that have topic features close to a feature representation of the topic prompt. Upon identifying the set of nodes, the content stack generation system 102 presents a set of content items corresponding to the set of nodes to the user account 202 in the form of the content stack 210.

To illustrate further, in some implementations, the content stack generation system 102 utilizes the large language model 206 to generate the content stack 210 by determining topic features for some (or all) of the content items represented by the stack formulation graph 204, and identifying relevant content items to include in the content stack 210 based on the topic features. For example, the content stack generation system 102 utilizes the large language model 206 to convert the content items into a feature space indicating topics of the content items (e.g., subjects that the content items relate to, based on their content). As discussed below, in some embodiments, the content stack generation system 102 identifies a topic prompt for the user account 202 (e.g., based on current or recent user account activity). The content stack generation system 102 compares the topic features of the content items with the topic prompt for the user account 202 to determine a set of content items to include in the content stack 210.

Figure 3:
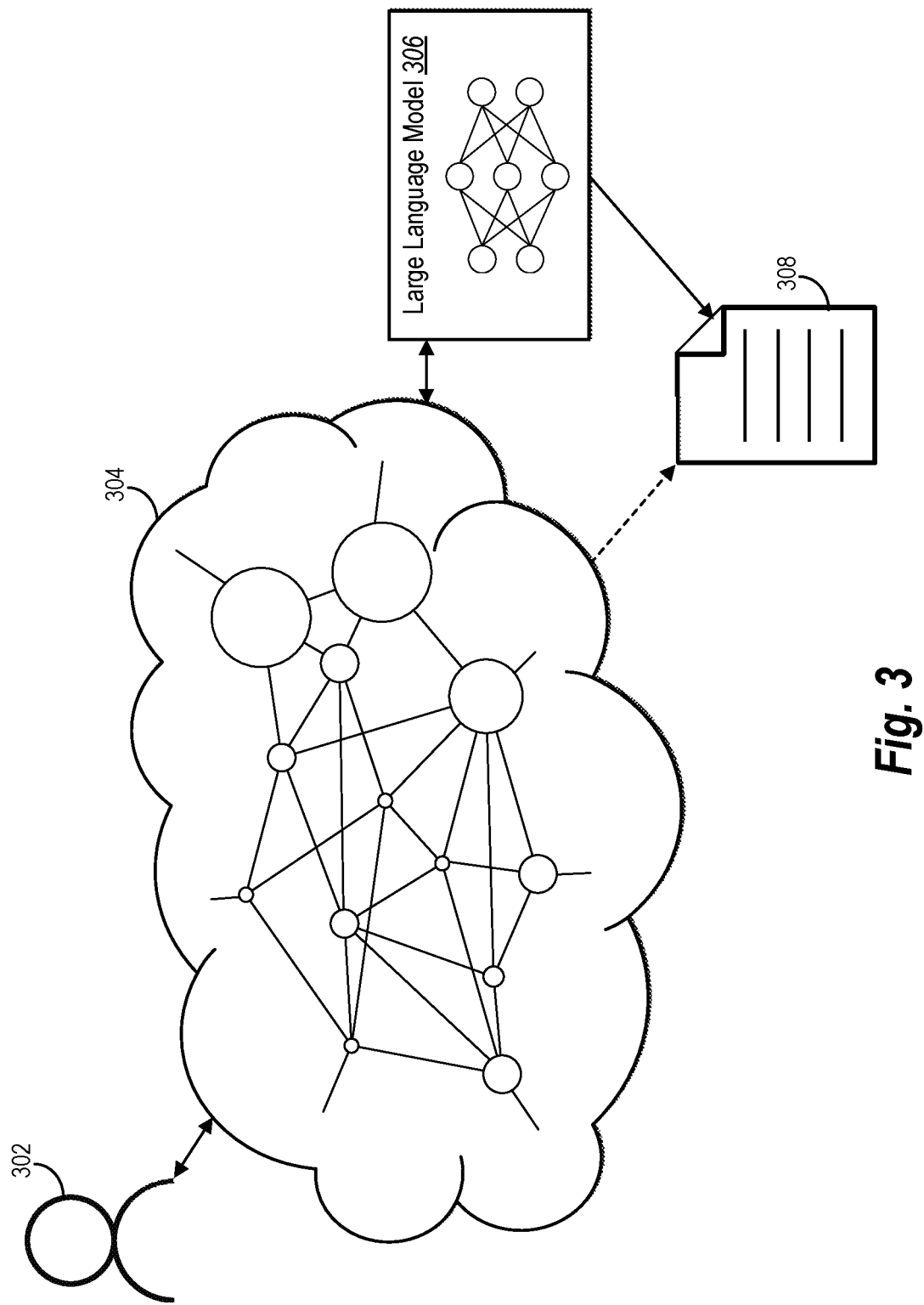
FIG. 3 illustrates an example diagram of the content stack generation system utilizing a large language model to analyze a stack formulation graph in accordance with one or more embodiments.

As mentioned above, in one or more embodiments, the content stack generation system 102 utilizes a large language model and/or a stack formulation graph to generate or identify content items to provide for display to a user account. In particular, the content stack generation system 102 generates or identifies a content item based on user interaction by analyzing the user interaction together with a stack formulation graph (e.g., via a large language model). FIG. 3 illustrates generating or identifying a content item to provide for display in a content stack by utilizing a large language model and a stack formulation graph in accordance with one or more embodiments.

As illustrated in FIG. 3, in some implementations, the content stack generation system 102 generates and utilizes a stack formulation graph 304 (e.g., the stack formulation graph 204 or similar) for a user account 302. In some embodiments, the content stack generation system 102 generates a user-account-specific stack formulation graph 304 for the user account 302, where the stack formulation graph 304 defines relationships associated with the user account 302, including relationships with content items and with other user accounts. In certain embodiments, the content stack generation system 102 generates a system-wide stack formulation graph that includes a node for the user account 302 and that includes nodes for content items and other user accounts within an entirety of the content management system 104 and/or for a particular organizational ontology (e.g., a company or a team of collaborating user accounts). Indeed, the content stack generation system 102 can generate multiple stack formulation graphs, including one that is specific to the user account 302 and one that is system-wide (or team-wide, organization-wide, etc.).

As shown, the content stack generation system 102 generates the stack formulation graph 304 using nodes to represent user accounts and content items, and using edges to represent relationships between the nodes (e.g., where shorter distances represent stronger or closer relationships than longer distances). To generate the stack formulation graph 304, the content stack generation system 102 monitors or detects user account behavior over time. For example, the content stack generation system 102 monitors user account accesses, shares, comments, edits, receipts, clips (e.g., generating content items from other content items), and/or other user interactions over time to determine frequencies, recencies, and/or overall numbers of user interactions (of the user account 302, of collaborating user accounts with the user account 302, and/or of similar user accounts) with content items and/or with other user accounts. In some cases, the content stack generation system 102 further utilizes a large language model 306 (e.g., the large language model 206 or another neural network) to determine topic features associated with content items. Indeed, in some implementations, the content stack generation system 102 generates, modifies, and maintains the stack formulation graph 304 using one or more machine-learning models (e.g., neural networks) to predict or determine relationships among content items and user accounts. For example, the content stack generation system 102 generates the stack formulation graph 304 by utilizing a machine-learning model to embed the content items into a latent vector space (e.g., indicating topic features of the various content items).

In some implementations, the content stack generation system 102 generates the stack formulation graph 304 as a three-dimensional stack formulation graph. For example, the content stack generation system 102 generates the nodes and edges of the stack formulation graph 304 as vectors in three-dimensional space that can be represented visually in a graphical user interface. In certain embodiments, the content stack generation system 102 utilizes higher-order dimensions to represent the stack formulation graph 304. For instance, the content stack generation system 102 can generate the nodes and edges of the stack formulation graph 304 in an n-dimensional vector space.

In some implementations, the content stack generation system 102 generates the stack formulation graph 304 based on content-based signals and account-based signals associated with the content items and user accounts. For example, the content stack generation system 102 determines the content-based signals from a plurality of content items (e.g., all or some of the content items in the content management system 104) associated with the user account 302. The content-based signals can indicate a composition of the plurality of content items, such as relationships among content items. For instance, the content stack generation system 102 determines that certain content items have the same or related author accounts, editor accounts, and/or viewer accounts. In some cases, the content stack generation system 102 determines that certain content items are similarly situated (e.g., in the same folder, associated with the same project, containing similar content). Moreover, the content stack generation system 102 can identify content-based signals from content within the content items, such as titles of the content items, URLs for the content items, links in the content items, text in the content items, and/or images in the content items. These types of content-based signals can indicate relationships among the content items. The content stack generation system 102 utilizes these types of content-based signals to classify the content items and generate nodes of the stack formulation graph 304 representing the content items, and edges between the nodes representing relationships between content items.

Additionally, in some embodiments, the content stack generation system 102 determines the account-based signals for the user account 302. The account-based signals can indicate content interaction data and account data associated with the user account 302. For instance, the content stack generation system 102 determines one or more access patterns of the user account 302 with the content items. To illustrate, the content stack generation system 102 determines that the user account 302 has recently and/or frequently opened particular content items. Additionally, or alternatively, the content stack generation system 102 determines that the user account 302 created, edited, shared, and/or viewed particular content items. Moreover, the content stack generation system 102 can track navigation patterns of the user account 302 through directories of content items to determine potentially relevant content items for the user account 302. Additionally, the content stack generation system 102 can determine which computing applications have been used to access particular content items. These types of content interaction data can indicate relationships between the user account 302 and the content items. Consequently, based on the content interaction data, the content stack generation system 102 can construct the stack formulation graph 304 indicating these relationships (e.g., short edges between nodes indicating close relationships) for the user account 302 and the particular content items.

Furthermore, in some implementations, the content stack generation system 102 can determine account data associated with the user account 302. For instance, the content stack generation system 102 identifies interaction patterns of the user account 302 with other user accounts in the content management system 104. As examples, the content stack generation system 102 determines that the user account 302 frequently communicates and/or shares content items with particular other user accounts, directly reports to another user account, and/or is grouped into a team with particular other user accounts. Moreover, the content stack generation system 102 can determine similarities of the user account 302 with other user accounts based on account demographic information, web browser history, similarities of navigation patterns or access patterns with content items, and/or co-access proximity between accounts. These types of account data can indicate relationships between the user account 302 and other user accounts. Consequently, based on the account data, the content stack generation system 102 can construct the stack formulation graph 304 indicating these relationships (e.g., short edges between nodes indicating close relationships) for the user account 302 and other user accounts.

As shown, the stack formulation graph 304 includes nodes and edges for content items and user accounts associated with the user account 302. In some cases, the content stack generation system 102 generates larger nodes for higher frequencies of interaction of the user account 302 with respective content items and user accounts. In these or other cases, the content stack generation system 102 generates edges to have lengths or distances that indicate closeness of relationships between nodes. For example, the content stack generation system 102 generates edges between nodes to reflect frequencies and/or recencies of interaction with respective content items (or topics) and user accounts. In some embodiments, the content stack generation system 102 generates edges to reflect the types of user interactions with the content items and user accounts (e.g., where edits indicate closer relationships than shares, which in turn indicate closer relationships than accesses). Indeed, the content stack generation system 102 can generate the stack formulation graph 304 based on combinations of numbers, recencies, frequencies, and types of user interactions by the user account 302 and other user accounts related to (e.g., collaborating with or within the same ontology as) the user account 302.

Relatedly, in some implementations, the content stack generation system 102 applies a filtering logic to the content-based signals indicating the composition of content items in the content management system 104. For instance, the content stack generation system 102 analyzes the content-based signals of numerous content items (e.g., a large set of content items within the content management system 104) to determine that some of the numerous content items can be excluded from the stack formulation graph 304 for the user account 302 (i.e., an account-specific stack formulation graph). For example, the content stack generation system 102 utilizes a predetermined filtering logic to filter out some of the content items from construction of the stack formulation graph 304. To illustrate, the content stack generation system 102 may exclude content items that, while the user account 302 has accessed in the past, have not been recently accessed. The content stack generation system 102 can determine that these content items are no longer a focus of the user account 302. As additional examples, the user account 302 might have visited a webpage only briefly, or received a link from only a distantly related account. Thus, the content stack generation system 102 can provide computationally efficient content stacks by reducing the size of the stack formulation graph 304.

As further illustrated in FIG. 3, the content stack generation system 102 utilizes the large language model 306 to analyze the stack formulation graph 304. More specifically, the content stack generation system 102 utilizes the large language model 306 to analyze a user interaction (e.g., a text query, a selection of an interface element, an acceptance of a calendar event, opening a team messaging thread, etc.) from the user account 302 and, in response, to analyze the stack formulation graph 304 to generate or identify a content item 308. For example, the content stack generation system 102 generates or identifies the content item 308 as a content item with a high probability of matching a topic prompt.

To generate or identify the content item 308, in some embodiments, the content stack generation system 102 determines an input intent (e.g., a topic prompt) from the user interaction. To elaborate, the content stack generation system 102 utilizes the large language model 306 to process the user interaction, such as a selection of an interface element for performing one or more predefined processes or an entered text query, to determine the input intent. For example, the content stack generation system 102 utilizes the large language model 306 to generate a set of input intent predictions using model parameters learned during model training (e.g., training on large sets of user interactions and corresponding ground truth input intents). In some cases, the content stack generation system 102 selects an input intent prediction with a highest probability as the input intent for a user interaction. For instance, the content stack generation system 102 determines an input intent to access a particular content item, to gather relevant documents for a team meeting, to generate an email to a particular recipient, to summarize a document, to answer a question about a particular topic, to identify user accounts associated with a project, or to schedule a meeting. The content stack generation system 102 can compare the selected input intent prediction with nodes of the stack formulation graph 304 to identify content items (or generate new content items) relevant to the input intent. Thus, the content stack generation system 102 can generate or identify the content item 308 based on the input intent. The content stack generation system 102 can add the content item 308 to a content stack for the user account 302.

In some implementations, the content stack generation system 102 establishes multiple profiles for a single user account. For instance, the content stack generation system 102 creates a work profile and a social profile for the user account 302. Based on these different profiles, the content stack generation system 102 can generate and provide different content stacks targeted to different interests and/or needs of the user account.

In some implementations, the content stack generation system 102 generates a personalization profile for a user that can persist across different systems and/or environments. For example, the content stack generation system 102 can facilitate a user changing jobs and/or roles within an organization. In particular, the content stack generation system 102 can generate a personalization profile for a user of the user account 302 and associate the personalization profile with a new user account for the user.

Additionally, in some implementations, the content stack generation system 102 publishes a content stack to other user accounts within the content management system 104. For example, based on an input from the user account 302, the content stack generation system 102 can share a content stack with other user accounts, thereby offering the flexibility of providing dynamic containers of shared knowledge across an organizational ontology.

As mentioned, in some implementations, the content stack generation system 102 adapts content stacks based on user account activity. For instance, FIG. 4 illustrates the content stack generation system 102 updating a content stack over a period of time in accordance with one or more embodiments.

Figure 4:
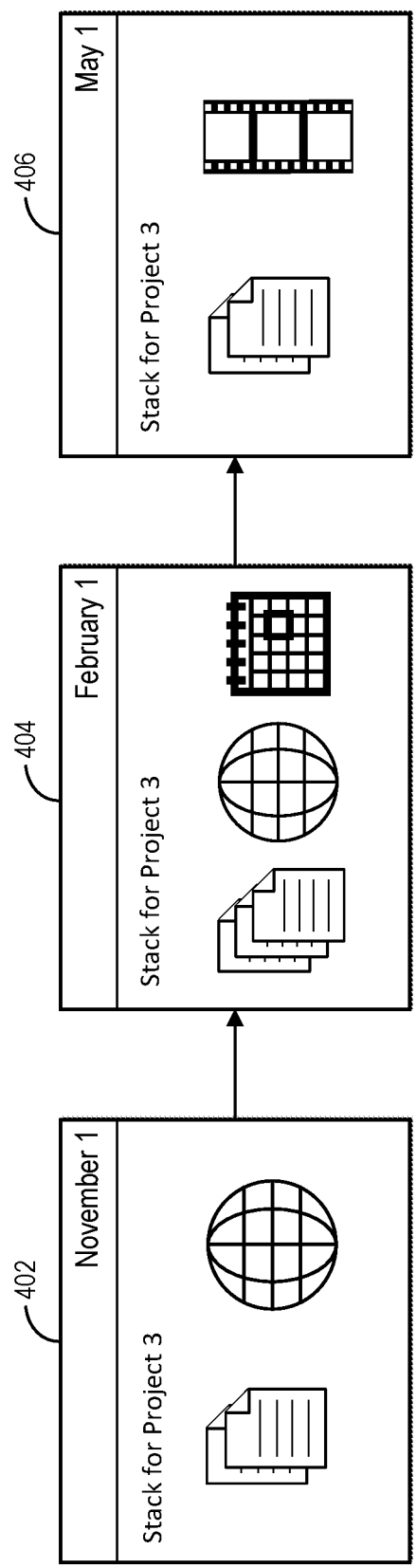
FIG. 4 illustrates an example diagram of the content stack generation system adapting a content stack over time in accordance with one or more embodiments.

To illustrate, FIG. 4 shows the content stack generation system 102 generating a content stack 402 for a user account. As shown, the content stack generation system 102 provides the content stack 402 on November 1 as a suggested stack of content items relevant to "Project 3." For instance, the content stack 402 may contain some digital documents and a webpage, among other possible content items. As discussed above, the content stack generation system 102 may determine that these content items are relevant content items for a particular need of a user account. For example, the content stack generation system 102 provides the content items in the content stack 402 as relevant to a project undertaken by the user account (e.g., "Project 3").

Over a period of time, the content stack generation system 102 monitors user account activity of the user account to determine potential changes to the content stack 402. For instance, FIG. 4 shows the content stack generation system 102 providing an updated content stack 404 on February 1 as a suggested content stack relevant to "Project 3" based on updates associated with the user account and progress through the project. For example, as a user account undertakes a project (or any other workflow or task), additional content items may become relevant to the user account. To illustrate, additional documents and other files, such as a calendar event, may become relevant to the project. Accordingly, the content stack generation system 102 can modify the content stack for the project and present the modified content stack.

To illustrate further, FIG. 4 shows the content stack generation system 102 providing a further updated content stack 406 on May 1 as a suggested content stack relevant to "Project 3." For example, as the user account progresses through the project, the content stack generation system 102 may determine that certain content items that were previously in the content stack are no longer relevant. Thus, the content stack generation system 102 updates the content stack to ensure that the included content items are those content items that are currently relevant to the user account. As shown in FIG. 4, the content stack generation system 102 excluded some content items (e.g., a digital document, a webpage, and a calendar event) from the further updated content stack 406 (e.g., of May 1) that were part of the updated content stack 404 (e.g., of February 1).

Stated another way, the content stack generation system 102 can monitor changes in user account activity and/or the corpus of content items, and manage content stacks accordingly. For example, the content stack generation system 102 identifies one or more changes in the composition of the content items, changes in account data, and/or new content interaction data. Based on these changes and/or new data, the content stack generation system 102 determines an update to the content-based signals for the content items and/or the account-based signals for the user account. Then, the content stack generation system 102 can generate an updated stack formulation graph, which may include some or all of the nodes of the original (or most recent) stack formulation graph, as well as additional nodes for new content items (e.g., newly created content items or newly relevant content items). The content stack generation system 102 can then modify the content stack to reflect the updates to the stack formulation graph. For example, the content stack generation system 102 determines comparison metrics between nodes of the updated stack formulation graph and the topic prompt for the user account. Utilizing these comparison metrics, the content stack generation system 102 determines a new set of relevant content items to include in the updated content stack.

In some cases, the content stack generation system 102 applies a filtering logic to update a content stack. For example, the content stack generation system 102 observes that a content item that a user account previously accessed on a frequent basis is no longer frequently accessed, or has not been accessed for a long period of time. In such a case, the content stack generation system 102 may remove the content item from a content stack.

As discussed above, in some implementations, the content stack generation system 102 generates and provides a content stack to a user account as a suggested collection of relevant content. For instance, FIG. 5 illustrates the content stack generation system 102 providing a content stack for display via a graphical user interface in accordance with one or more embodiments.

Figure 5:
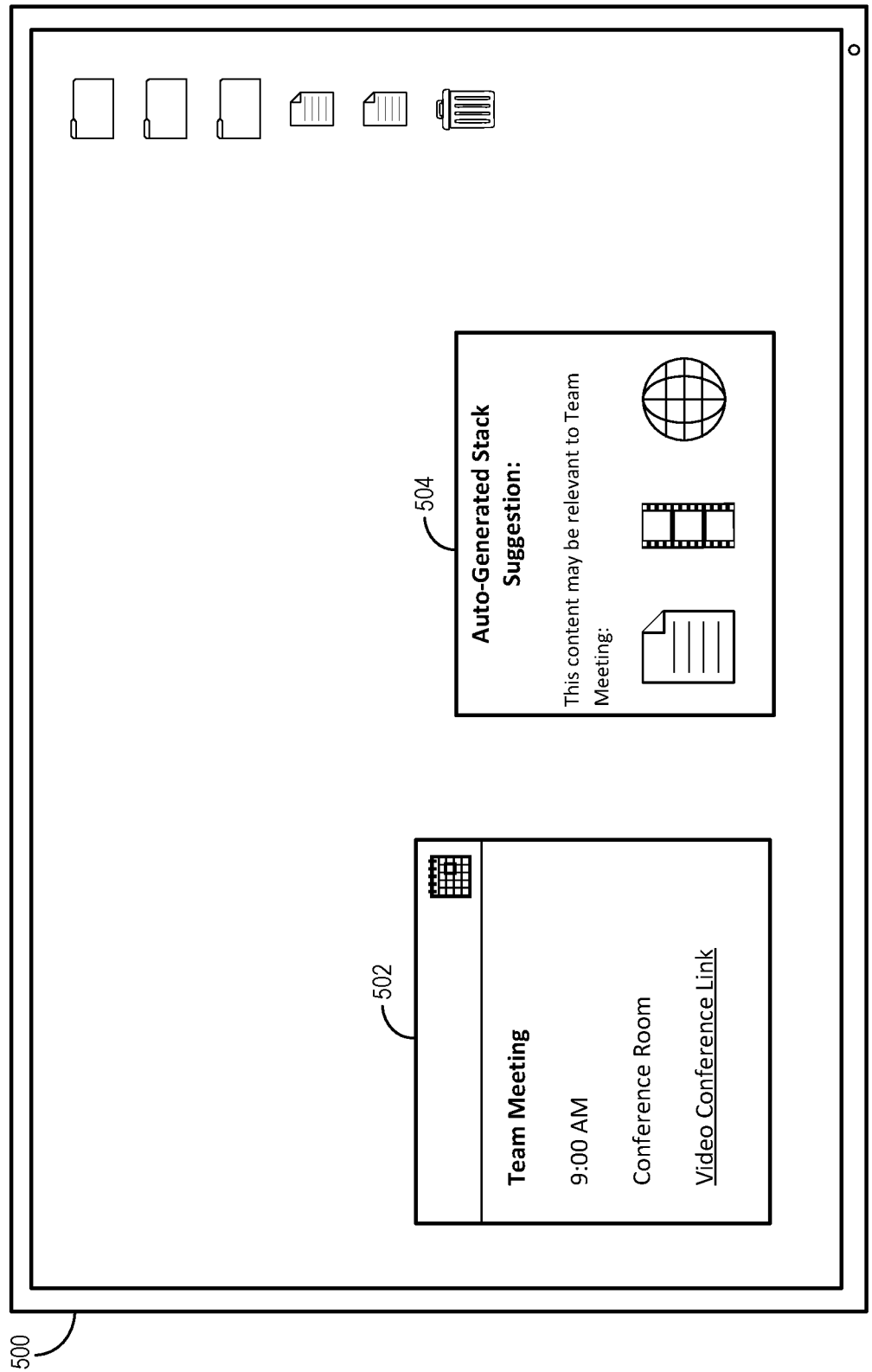
FIG. 5 illustrates a display via a graphical user interface of an example content stack in accordance with one or more embodiments.

For example, FIG. 5 shows a graphical user interface of a client device 500 displaying a calendar event 502 for "Team Meeting." In some implementations, the content stack generation system 102 utilizes the large language model 118 to analyze the calendar event 502 and define a topic prompt for the calendar event 502. For instance, the content stack generation system 102 determines the topic prompt based on a description for the calendar event 502 and/or account data of invited participants (e.g., other user accounts) to the calendar event 502.

Based on the topic prompt, the content stack generation system 102 can generate a content stack 504 to suggest to the user account. For instance, FIG. 5 shows the content stack generation system 102 suggesting the content stack 504 containing a digital document, a digital video, and a webpage. The content stack generation system 102 offers the suggested content stack 504 as containing content items likely relevant to Team Meeting. In this way, the content stack generation system 102 can offer flexibility by providing relevant content items in a single user interface, thereby alleviating a need that the user account would otherwise have to drill down a folder hierarchy and/or utilize multiple computing applications to access the same content items.

As mentioned, in some implementations, the content stack generation system 102 generates a topic prompt for the user account. To illustrate, the content stack generation system 102 can detect a trigger that signals a new topic need of the user account. For example, the content stack generation system 102 can determine an intent of the user account by drawing upon web browser history, open tabs in a web browser, calendar events, file access patterns, duration of the user account in a role within an organization ontology, a current team project or endeavor in which the user account is participating, detecting that the user account is currently in a virtual meeting, and/or determining a type of meeting for the user account (e.g., a work meeting, a social meeting, etc.). Based on the predicted intent of the user account, the content stack generation system 102 can determine the topic prompt for suggesting a new (or updated) content stack. The content stack generation system 102 can generate the topic prompt (and resulting content stack) dynamically, thereby presenting relevant content to a user account in real time (e.g., during a meeting, upon assignment of a new project, etc.). Additionally, the content stack generation system 102 can consider content-based signals in the file corpus of the content management system 104, third-party connected services, and/or web-based content that the user account has not previously accessed (but that may be relevant) when generating a topic prompt (and, resultingly, a content stack).

As mentioned, in some implementations, the content stack generation system 102 utilizes the topic prompt to generate a content stack. For instance, the content stack generation system 102 compares content items with the topic prompt. In particular, the content stack generation system 102 compares nodes of the stack formulation graph to the topic prompt. For those nodes that have topic features similar to the topic prompt, the content stack generation system 102 can include the corresponding content items in the content stack. For example, the content stack generation system 102 determines which nodes of the stack formulation graph satisfy a similarity threshold to the topic prompt.

More particularly, in some embodiments, the content stack generation system 102 determines comparison metrics between nodes of the stack formulation graph and the topic prompt. For instance, the content stack generation system 102 determines a cosine similarity between topic features for the content items and the topic prompt. To illustrate, in some implementations, the content stack generation system 102 generates topic feature vectors representing nodes of the stack formulation graph. For example, the content stack generation system 102 utilizes the large language model to embed content items in a feature vector space that represents topics or descriptions of the content items. In some cases, the topic features are in the same vector space as the topic prompt. The content stack generation system 102 can determine a distance between a topic feature for a node and the topic prompt. For instance, the content stack generation system 102 determines a cosine distance between the topic prompt and the topic feature vector for a node. Other examples include, but are not limited to, the content stack generation system 102 determining the distance between the topic feature and the topic prompt by determining a correlation metric, a Minkowski distance (e.g., a Euclidean distance, a Manhattan distance, a Chebyshev distance), a Canberra distance, a Hamming distance, or some other similarity metric.

In some embodiments, the content stack generation system 102 generates the content stack by determining a cluster of nodes around a relevant node. For instance, the content stack generation system 102 first identifies a relevant content item for a topic prompt (i.e., a relevant node). Utilizing the edge distances of the stack formulation graph, the content stack generation system 102 can identify additional relevant content items by identifying nodes near the first relevant node. For example, the content stack generation system 102 identifies nodes separated from the first relevant node by edges having lengths shorter than a threshold length. Utilizing these nodes clustered around the first relevant node, the content stack generation system 102 can populate a content stack with content items corresponding to the nodes in the cluster.

In some implementations, the content stack generation system 102 provides a content stack (or adds a content item to a content stack) that includes an action item, decision, or task determined during a team meeting. For example, the content stack generation system 102 utilizes a transcript of a videoconference or audio recording to identify an action item from the conference, and scrapes the action item (e.g., a paragraph describing the action item) from the transcript to generate a new content item for the action item. The content stack generation system 102 can generate a new node for the new content item within one or more stack formulation graphs and update a content stack (e.g., content stack 504) for the user account.

In some cases, the content stack generation system 102 generates a content stack based on a prompt from the user account. For instance, the user account may enter a text query requesting relevant files and/or webpages for a specific question or task. The content stack generation system 102 can generate a topic prompt based on the text query, and then utilize the topic prompt to determine relevant content items, as discussed above. Additionally, the content stack generation system 102 can utilize the large language model to generate the topic prompt based on a particular content item with which the user account is currently interacting.

In some embodiments, the content stack generation system 102 adds a suggested label to a content stack. For example, the content stack generation system 102 includes a text description at the top of a stack to indicate a topic of the stack. Additionally, the content stack generation system 102 can generate sub-descriptions for a content stack, such as section-level descriptions (for sections of content items within the stack) and/or item-level descriptions (for individual content items in the stack). In some implementations, the content stack generation system 102 utilizes a large language model (or another machine-learning model) to generate descriptions. In some implementations, the content stack generation system 102 pulls descriptions from metadata of content items.

As mentioned above, in some implementations, the content stack generation system 102 offers to a user account a variety of interaction options with a content stack. For instance, FIG. 6 illustrates the content stack generation system 102 providing a content stack for display via a graphical user interface with selection elements to save, open, and edit the content stack in accordance with one or more embodiments.

Figure 6:
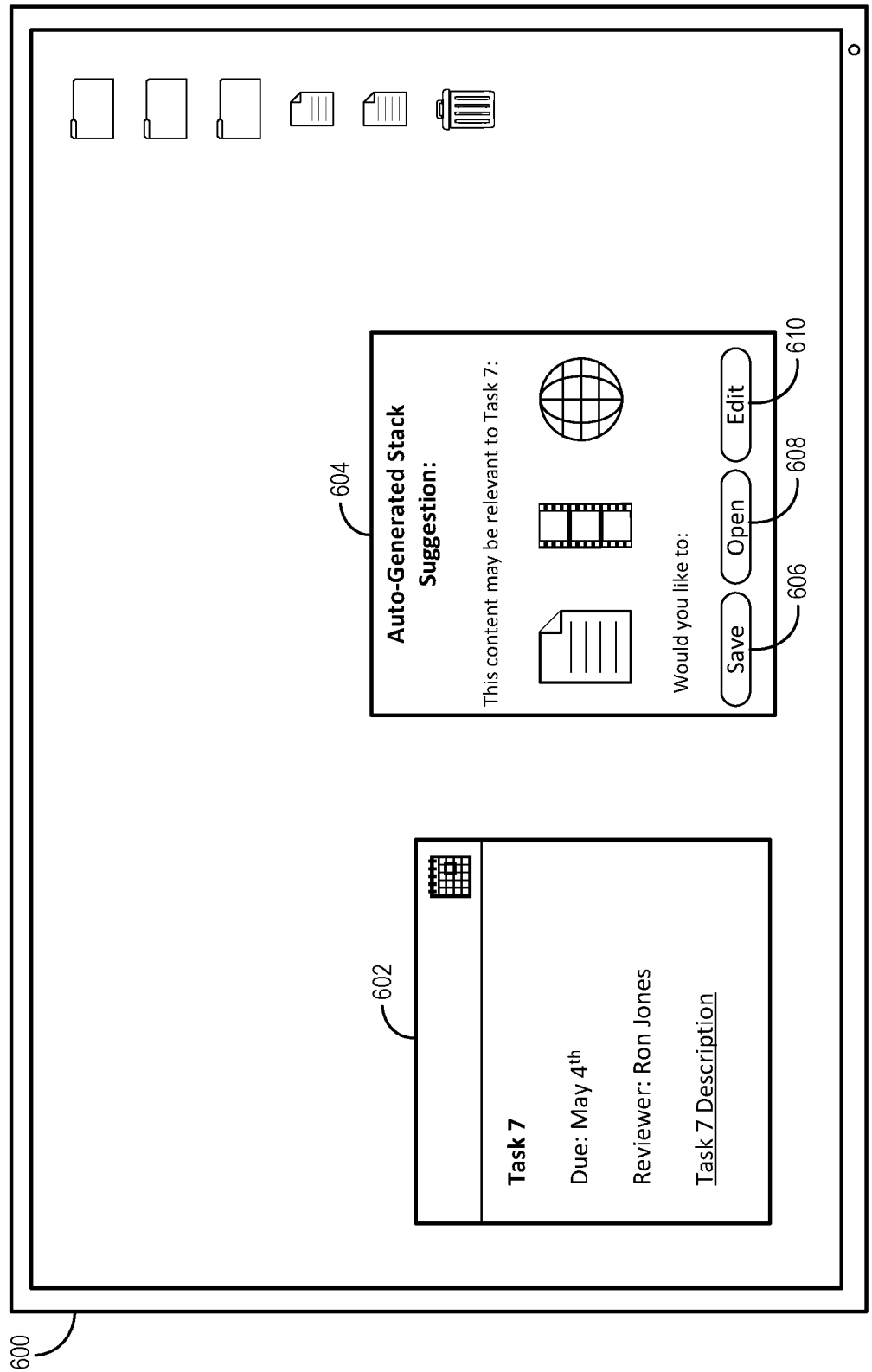
FIG. 6 illustrates a display via a graphical user interface of an example content stack and example user interaction options for the example content stack in accordance with one or more embodiments.

For example, FIG. 6 shows a graphical user interface of a client device 600 displaying a task item 602 for "Task 7." In some implementations, the content stack generation system 102 utilizes the large language model 118 to analyze the task item 602 and define a topic prompt for the task item 602. For instance, the content stack generation system 102 determines the topic prompt based on a description for the task item 602 and/or account data of related accounts (e.g., other user accounts that contribute to the task item, such as a reviewer account) to the task item 602.

Based on the topic prompt, the content stack generation system 102 can generate a content stack 604 to suggest to the user account. For instance, FIG. 6 shows the content stack generation system 102 suggesting the content stack 604 containing a digital document, a digital video, and a webpage. The content stack generation system 102 offers the suggested content stack 604 as containing content items likely relevant to Task 7. In some implementations, the content stack generation system 102 offers selection options for the user account to interact with the content stack 604.

For instance, the content stack generation system 102 can offer the user account to select a save option 606 to save the content stack 604. By saving the content stack, the user account has the option to store metadata associated with the content stack that allows the user account to retrieve at a later time the exact content items presented in the content stack 604. By contrast, in some cases, the user account may opt not to save the content stack, instead relying on the content stack generation system 102 to generate a new content stack at a later date for the same topic prompt. In some cases, the content stack generation system 102 determines that the body of content items are substantially the same vis-à-vis the topic prompt, and thus generates an identical content stack as a previous content stack. In other cases, the content stack generation system 102 determines that there are changes to the body of content, such as a new content item that is likely relevant to the topic prompt, and the content stack generation system 102 generates a new (or an updated) content stack that reflects the changes (e.g., that includes the new content item).

To further illustrate account interactions with content stacks, FIG. 6 shows that the content stack generation system 102 can offer the user account to select an open option 608 to open the content stack 604. For instance, the content stack generation system 102 can generate a user interface to open, view, edit, save, and/or close the content items of the content stack 604. In some embodiments, the content stack generation system 102 provides a user interface to open multiple content items of the content stack 604 simultaneously in a single user interface.

Additionally, in some implementations, the content stack generation system 102 offers the user account an edit option 610 to modify the content stack 604. For example, the content stack generation system 102 can adapt the content stack 604 based on an input from the user account, such as an input to include a particular content item, to exclude a particular content item, or to change the order that the content items are presented.

In some implementations, the content stack generation system 102 saves a content stack that includes an answer to a search query. For example, the content stack generation system 102 utilizes the large language model (or another machine-learning model) to determine an answer to a search query, and populates a content stack with the answer, along with other content items relevant to the search query. In some cases, the content stack generation system 102 searches within one or more files to locate the answer to the search query and populates the content stack with the answer from the one or more files.

As mentioned, in some implementations, the content stack generation system 102 provides an interface to edit one or more content items within a content stack. For instance, FIG. 7 illustrates the content stack generation system 102 integrating a content editing application within a content stack interface in accordance with one or more embodiments.

Figure 7:
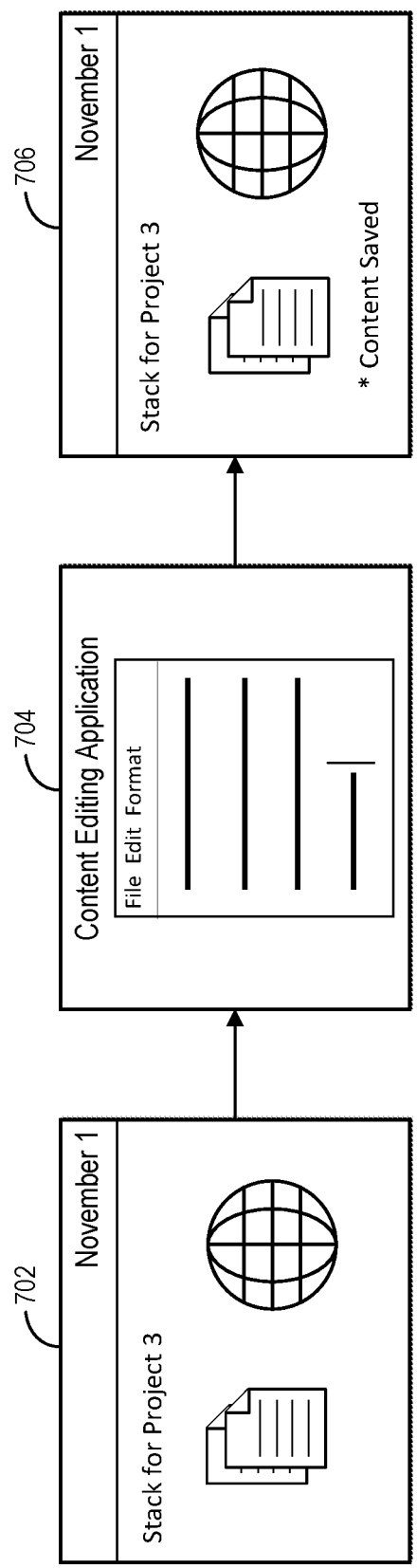
FIG. 7 illustrates an example diagram of the content stack generation system modifying one or more content items within a content stack in accordance with one or more embodiments.

For example, FIG. 7 shows a content stack 702 (e.g., a suggested content stack for "Project 3" on November 1). In some implementations, the content stack generation system 102 communicates with an API of a content editing application to provide a content stack interface 704 that includes the content editing application. To illustrate, the content stack generation system 102 can generate a virtual desktop or an application within an application for content editing. For instance, the content stack generation system 102 provides the content stack interface 704 displaying content items of the content stack, and renders an editing window within the content stack interface 704 to modify a content item. For example, the content stack generation system 102 can interface with one or more of document processing applications, spreadsheet applications, slide presentation applications, email applications, messaging applications, calendar applications, image editing applications, video editing applications, webpage creation applications, text editing applications, task tracking applications, and/or code development applications, etc. The content stack generation system 102 can receive user inputs in the editing window within the content stack interface 704. For instance, the content stack generation system 102 can detect edits to a content item within the editing window.

Based on the edits to the content item, the content stack generation system 102 can save the content item. For example, FIG. 7 shows a content stack 706, which is the same as the content stack 702, but reflecting that one or more content items within the stack have been saved. Thus, the content stack generation system 102 can offer flexibility by allowing a user account to edit and save content items in a single user interface (e.g., without a need to open the content items in separate computing applications).

In some implementations, the content stack generation system 102 provides the content stack within a computing application. In some implementations, the content stack generation system 102 provides the content stack within a widget on a desktop or home screen of a client device. In some implementations, the content stack generation system 102 provides the content stack within a start page of a web browser.

As noted, in some embodiments, the content stack generation system 102 provides added flexibility over existing systems by allowing a user account to pick up a task or workflow where the user account left off previously, by quickly providing relevant content to the user account without a need to drill down through a directory or list of content items in a computing application.

Figure 8:
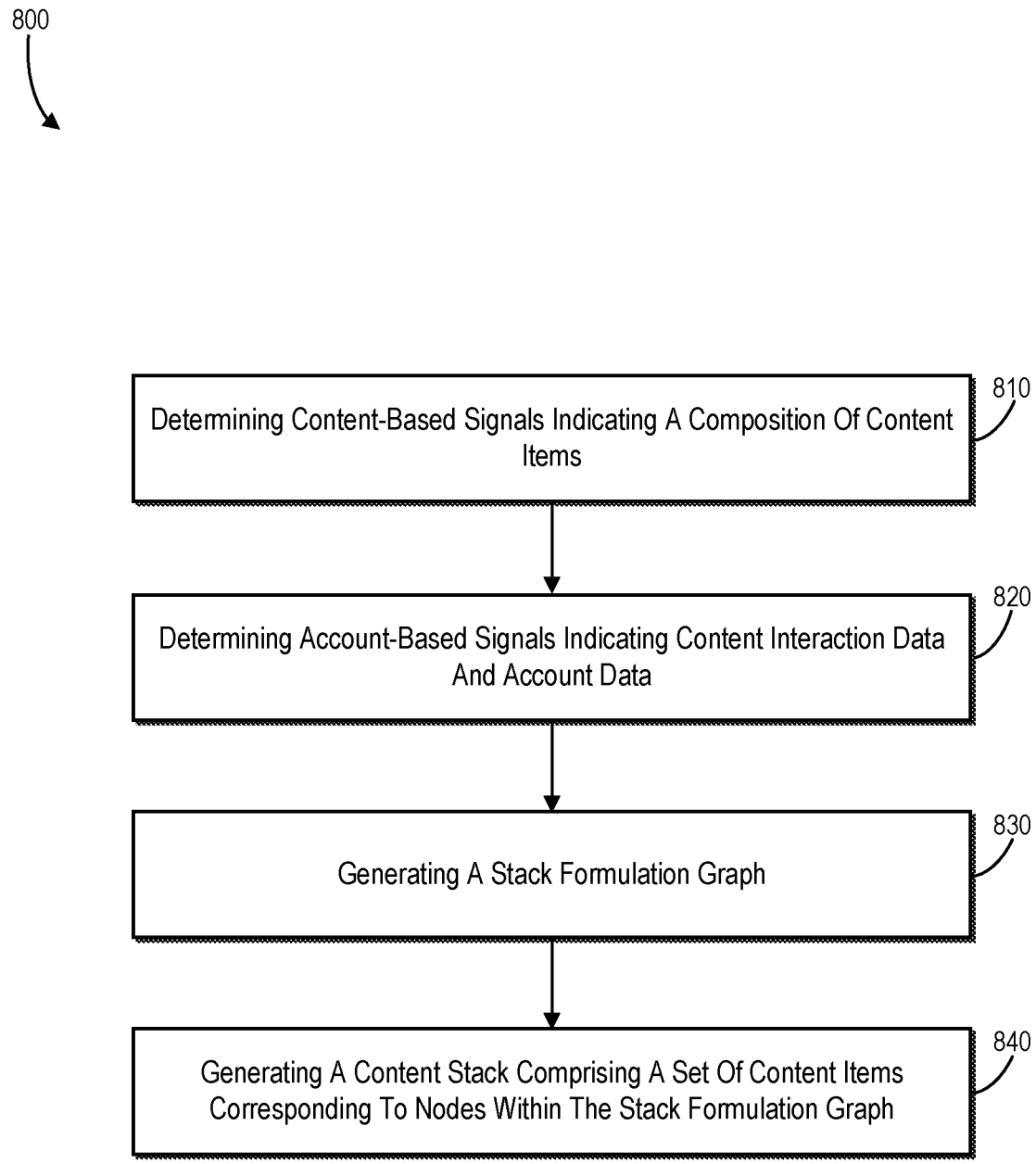
FIG. 8 illustrates a flowchart of a series of acts for generating a content stack in accordance with one or more embodiments.

FIGS. 1-7, the corresponding text, and the examples provide a number of different methods, systems, devices, and non-transitory computer-readable media of the content stack generation system 102. In addition to the foregoing, one or more embodiments can also be described in terms of flowcharts comprising acts for accomplishing a particular result, as shown in FIG. 8. FIG. 8 may be performed with more or fewer acts. Further, the acts may be performed in differing orders. Additionally, the acts described herein may be repeated or performed in parallel with one another or parallel with different instances of the same or similar acts.

As mentioned, FIG. 8 illustrates a flowchart of a series of acts 800 for generating a content stack in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8.

As shown in FIG. 8, the series of acts 800 includes an act 810 of determining content-based signals indicating a composition of content items, an act 820 of determining account-based signals indicating content interaction data and account data, an act 830 of generating a stack formulation graph, and an act 840 of generating a content stack comprising a set of content items corresponding to nodes within the stack formulation graph.

In particular, the act 810 can include determining, from a plurality of content items associated with a user account of a content management system, content-based signals indicating a composition of the plurality of content items, the act 820 can include determining, for the user account of the content management system, account-based signals indicating content interaction data and account data associated with the user account, the act 830 can include generating, based on the content-based signals and the account-based signals, a three-dimensional stack formulation graph comprising: nodes representing the plurality of content items and user accounts within the content management system; and edges representing relationships between the plurality of content items and the user accounts within the content management system, and the act 840 can include generating, from the three-dimensional stack formulation graph, a content stack comprising a set of content items corresponding to nodes within the three-dimensional stack formulation graph.

Moreover, in some embodiments, the act 810 can include determining content-based signals indicating a composition of a plurality of content items accessible by a content management system, the act 820 can include determining account-based signals indicating content interaction data and account data for a user account of the content management system, the act 830 can include generating, based on the content-based signals and the account-based signals, a three-dimensional stack formulation graph comprising nodes representing the plurality of content items, and the act 840 can include generating, from the three-dimensional stack formulation graph, a content stack comprising a set of content items corresponding to nodes satisfying a similarity threshold to a topic prompt.

Furthermore, in some implementations, the act 810 can include determining, from a plurality of content items associated with a user account of a content management system, content-based signals indicating a composition of the plurality of content items, the act 820 can include determining, for the user account of the content management system, account-based signals indicating content interaction data and account data associated with the user account, the act 830 can include generating, based on the content-based signals and the account-based signals, a stack formulation graph comprising: nodes representing the plurality of content items; and edges representing relationships of the plurality of content items, an additional act can include determining comparison metrics between at least a portion of the nodes of the stack formulation graph and a topic prompt, and the act 840 can include generating a content stack comprising a set of content items corresponding to nodes having comparison metrics satisfying a similarity threshold.

In particular, in one or more implementations, the series of acts 800 includes wherein determining the content-based signals indicating the composition of the plurality of content items comprises determining one or more relationships between the plurality of content items. Alternatively, or additionally, the series of acts 800 can include wherein determining the content-based signals indicating the composition of the plurality of content items comprises filtering the plurality of content items based on a predetermined filtering logic.

Moreover, in one or more embodiments, the series of acts 800 includes wherein determining the account-based signals indicating the content interaction data and the account data comprises determining one or more of access patterns of the user account with the plurality of content items or interaction patterns of the user account with the user accounts. Alternatively, or additionally, the series of acts 800 can include wherein determining the account-based signals indicating the content interaction data and the account data comprises determining one or more of access patterns of the user account with the plurality of content items or interaction patterns of the user account with other user accounts of the content management system.

Furthermore, in one or more implementations, the series of acts 800 includes wherein generating the three-dimensional stack formulation graph comprises utilizing a machine-learning model to determine the relationships between the plurality of content items and the user accounts. Alternatively, or additionally, the series of acts 800 can include wherein generating the three-dimensional stack formulation graph comprises utilizing a machine-learning model to embed the plurality of content items into a latent vector space. Alternatively, or additionally, the series of acts 800 can include wherein generating the stack formulation graph comprises utilizing a machine-learning model to determine the relationships of the plurality of content items.

In addition, in one or more embodiments, the series of acts 800 includes wherein generating the content stack comprising the set of content items comprises utilizing a large language model to: determine topic features for at least a portion of the plurality of content items; and identify the set of content items based on the topic features. Alternatively, or additionally, the series of acts 800 can include wherein generating the content stack comprises: utilizing a large language model to determine topic features for at least a portion of the plurality of content items; and determining the set of content items by comparing the topic features with the topic prompt. Alternatively, or additionally, the series of acts 800 can include wherein determining the comparison metrics comprises determining a cosine distance between the topic prompt and a topic feature vector representing a node of the stack formulation graph. Alternatively, or additionally, the series of acts 800 can include wherein generating the content stack comprises determining a cluster of nodes separated by edges having lengths shorter than a threshold length.

Moreover, in one or more implementations, the series of acts 800 includes providing, for display via a graphical user interface, the content stack comprising the set of content items; and modifying at least one content item of the set of content items based on receiving inputs from the user account. Alternatively, or additionally, the series of acts 800 can include providing, for display via a graphical user interface of a client device, the content stack comprising the set of content items; and modifying at least one content item of the set of content items based on inputs from the client device. Alternatively, or additionally, the series of acts 800 can include providing a copy of the set of content items in the content stack to a client device associated with the user account; and modifying at least one content item of the set of content items based on inputs from the client device.

Furthermore, in one or more embodiments, the series of acts 800 includes generating a personalization profile for a user of the user account; and associating the personalization profile with a new user account for the user. Alternatively, or additionally, the series of acts 800 can include generating a personalization profile for a user of the user account; and associating the personalization profile with a new user account of the content management system.

In addition, in some implementations, the series of acts 800 includes determining, based on at least one of a change in the composition of the plurality of content items or new content interaction data, an update to at least one of the content-based signals or the account-based signals; generating, based on the update to the at least one of the content-based signals or the account-based signals, an updated stack formulation graph comprising at least some of the nodes of the stack formulation graph; determining new comparison metrics between at least a portion of the nodes of the updated stack formulation graph and the topic prompt; and modifying the content stack based on the new comparison metrics.

Embodiments of the present disclosure may comprise or utilize a special purpose or general purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions from a non-transitory computer-readable medium (e.g., memory) and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general purpose computer, special purpose computer, or special purpose processing device to perform a certain function or group of functions. In some embodiments, computer-executable instructions are executed by a general purpose computer to turn the general purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), a web service, Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 9:
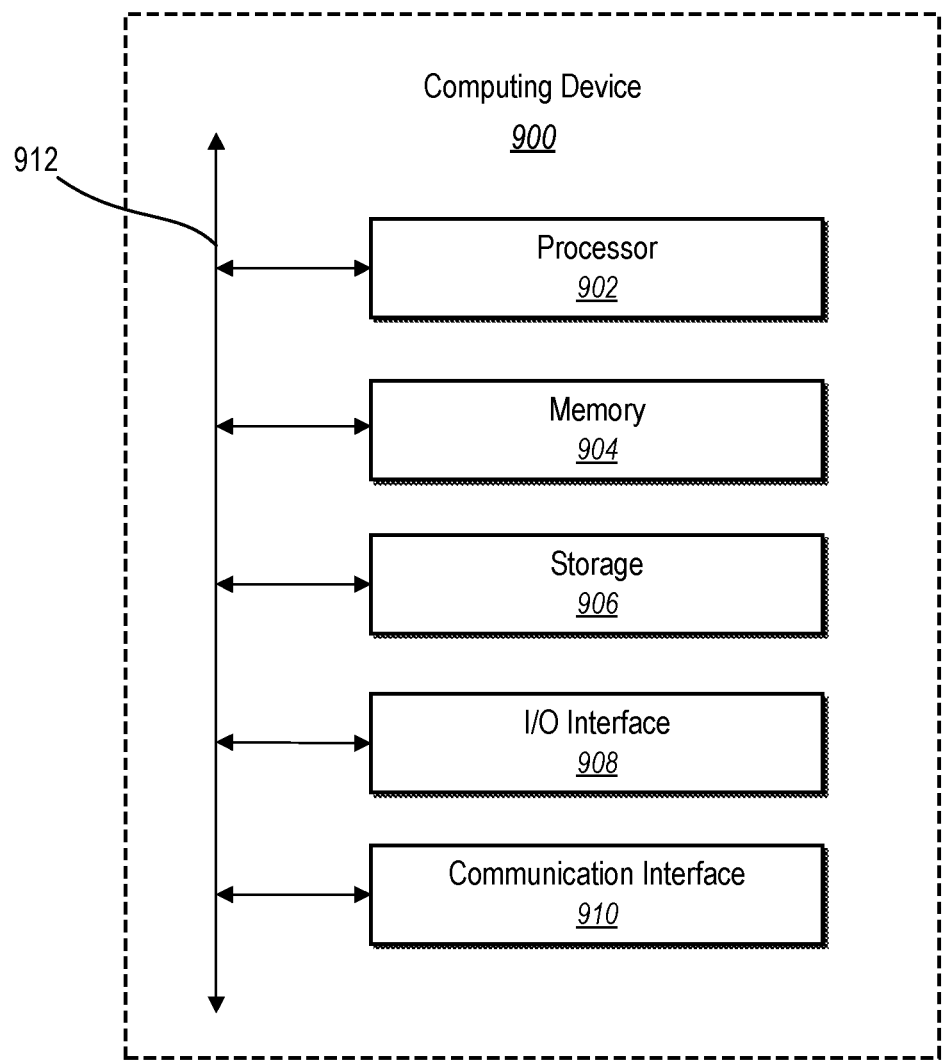
FIG. 9 illustrates a block diagram of an example computing device for implementing one or more embodiments of the present disclosure.

FIG. 9 illustrates a block diagram of an example computing device 900 that may be configured to perform one or more of the processes described above. One will appreciate that one or more computing devices, such as the computing device 900, may represent the computing devices described above (e.g., the server device(s) 106, the client device 108). In one or more embodiments, the computing device 900 may be a mobile device (e.g., a mobile telephone, a smartphone, a PDA, a tablet, a laptop, a camera, a tracker, a watch, a wearable device, etc.). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes the memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes the storage device 906 for storing data or instructions. As an example, and not by way of limitation, the storage device 906 can include a non-transitory storage medium described above. The storage device 906 may include a hard disk drive ("HDD"), flash memory, a Universal Serial Bus ("USB") drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller ("NIC") or network adapter for communicating with an Ethernet or other wire-based network or a wireless NIC ("WNIC") or wireless adapter for communicating with a wireless network, such as a WI-FI. The computing device 900 can further include the bus 912. The bus 912 can include hardware, software, or both that connects components of computing device 900 to each other.

The components of the content stack generation system 102 can include software, hardware, or both. For example, the components of the content stack generation system 102 can include one or more instructions stored on a computer-readable storage medium and executable by processors of one or more computing devices, such as a client device or server device. When executed by the one or more processors, the computer-executable instructions of the content stack generation system 102 can cause the computing device(s) to perform the methods described herein. Alternatively, the components of the content stack generation system 102 can include hardware, such as a special purpose processing device to perform a certain function or group of functions. Alternatively, the components of the content stack generation system 102 can include a combination of computer-executable instructions and hardware.

Furthermore, the components of the content stack generation system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the content stack generation system 102 may be implemented as a stand-alone application, such as a desktop or mobile application. Furthermore, the components of the content stack generation system 102 may be implemented as one or more web-based applications hosted on a remote server. The components of the content stack generation system 102 may also be implemented in a suite of mobile device applications or "apps."

Figure 10:
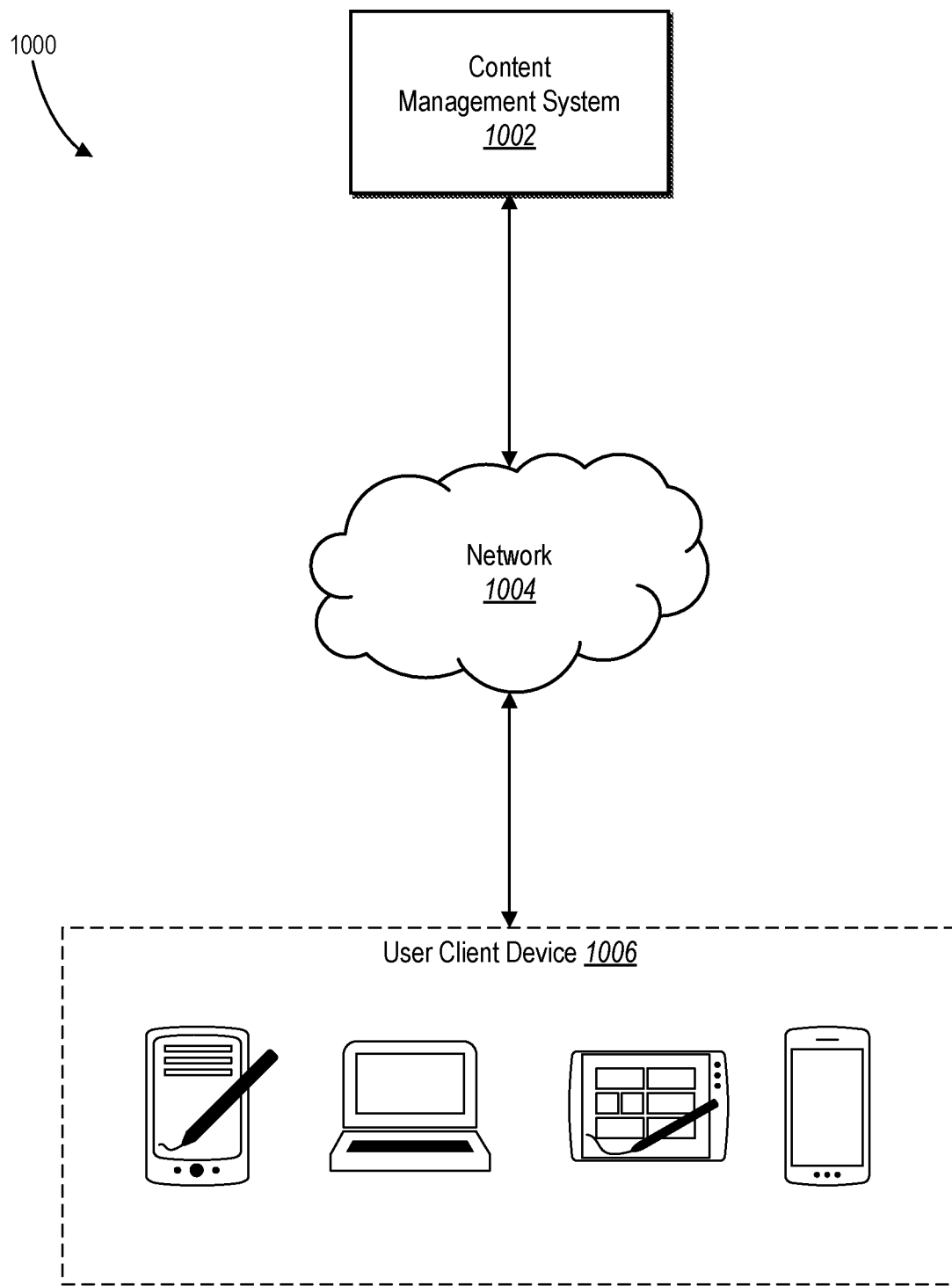
FIG. 10 illustrates a network environment of a content management system in accordance with one or more embodiments.

FIG. 10 is a schematic diagram illustrating a network environment 1000 within which one or more implementations of the content stack generation system 102 can be implemented. For example, the content stack generation system 102 may be part of a content management system 1002 (e.g., the content management system 104). The content management system 1002 may generate, store, manage, receive, and send digital content (such as digital content items). For example, the content management system 1002 may send and receive digital content to and from client device(s) 1006 by way of a network 1004. In particular, the content management system 1002 can store and manage a collection of digital content. The content management system 1002 can manage the sharing of digital content between computing devices associated with a plurality of users. For instance, the content management system 1002 can facilitate a user sharing digital content with another user of the content management system 1002.

In particular, the content management system 1002 can manage synchronizing digital content across multiple client devices 1006 associated with one or more users. For example, a user may edit digital content using client device 1006. The content management system 1002 can cause client device 1006 to send the edited digital content to the content management system 1002. The content management system 1002 then synchronizes the edited digital content on one or more additional computing devices.

In addition to synchronizing digital content across multiple devices, one or more implementations of the content management system 1002 can provide an efficient storage option for users that have large collections of digital content. For example, the content management system 1002 can store a collection of digital content on the content management system 1002, while the client device 1006 only stores reduced-sized versions of the digital content. A user can navigate and browse the reduced-sized versions (e.g., a thumbnail of a digital image) of the digital content on the client device 1006. In particular, one way in which a user can experience digital content is to browse the reduced-sized versions of the digital content on the client device 1006.

Another way in which a user can experience digital content is to select a reduced-size version of digital content to request the full- or high-resolution version of digital content from the content management system 1002. In particular, upon a user selecting a reduced-sized version of digital content, the client device 1006 sends a request to the content management system 1002 requesting the digital content associated with the reduced-sized version of the digital content. The content management system 1002 can respond to the request by sending the digital content to the client device 1006. The client device 1006, upon receiving the digital content, can then present the digital content to the user. In this way, a user can have access to large collections of digital content while minimizing the amount of resources used on the client device 1006.

The client device 1006 may be a desktop computer, a laptop computer, a tablet computer, a personal digital assistant (PDA), an in- or out-of-car navigation system, a smart TV, a virtual reality (VR) or augmented reality (AR) device, a handheld device, a wearable device, a smartphone or other cellular or mobile phone, or a mobile gaming device, other mobile device, or other suitable computing devices. The client device 1006 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.) to access and view content over the network 1004.

The network 1004 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the client device(s) 1006 may access the content management system 1002.

The use in the foregoing description and in the appended claims of the terms "first," "second," "third," etc., is not necessarily to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget, and not necessarily to connote that the second widget has two sides.

In the foregoing description, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with fewer or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   determining, from a plurality of content items associated with a user account of a content management system, content-based signals indicating relationships between the plurality of content items;
   determining, for the user account of the content management system, account-based signals indicating access patterns of the user account with the plurality of content items;
   generating, based on the content-based signals and the account-based signals, a stack formulation graph comprising:
      nodes representing the plurality of content items and user accounts within the content management system; and
      edges representing relationships between the plurality of content items and the user accounts within the content management system; and
   generating, from the stack formulation graph, a content stack comprising a set of content items corresponding to nodes within the stack formulation graph.

2. The computer-implemented method of claim 1, wherein determining the content-based signals indicating the relationships between the plurality of content items comprises determining one or more content relationships between the plurality of content items.

3. The computer-implemented method of claim 1, wherein determining the account-based signals comprises determining interaction patterns of the user account with the user accounts.

4. The computer-implemented method of claim 1, wherein generating the stack formulation graph comprises utilizing a machine-learning model to determine the relationships between the plurality of content items and the user accounts.

5. The computer-implemented method of claim 1, wherein generating the content stack comprising the set of content items comprises utilizing a large language model to:
   determine topic features for at least a portion of the plurality of content items; and
   identify the set of content items based on the topic features.

6. The computer-implemented method of claim 1, further comprising:
   providing, for display via a graphical user interface, the content stack comprising the set of content items; and
   modifying at least one content item of the set of content items based on receiving inputs from the user account.

7. The computer-implemented method of claim 1, further comprising:
   generating a personalization profile for a user of the user account; and
   associating the personalization profile with a new user account for the user.

8. A system comprising:
at least one processor; and
at least one non-transitory computer-readable storage medium comprising instructions that, when executed by the at least one processor, cause the system to:
- determine content-based signals indicating relationships between a plurality of content items accessible by a content management system;
- determine account-based signals indicating access patterns of a user account of the content management system with the plurality of content items;
- generate, based on the content-based signals and the account-based signals, a stack formulation graph comprising nodes representing the plurality of content items; and
- generate, from the stack formulation graph, a content stack comprising a set of content items corresponding to nodes satisfying a similarity threshold to a topic prompt.

9. The system of claim 8, wherein determining the content-based signals indicating the relationships between the plurality of content items comprises filtering the plurality of content items based on a predetermined filtering logic.

10. The system of claim 8, wherein determining the account-based signals comprises determining interaction patterns of the user account with other user accounts of the content management system.

11. The system of claim 8, wherein generating the stack formulation graph comprises utilizing a machine-learning model to embed the plurality of content items into a latent vector space.

12. The system of claim 8, wherein generating the content stack comprises:
- utilizing a large language model to determine topic features for at least a portion of the plurality of content items; and
- determining the set of content items by determining cosine similarities between the topic features and the topic prompt.

13. The system of claim 8, wherein the instructions, when executed by the at least one processor, further cause the system to:
- provide, for display via a graphical user interface of a client device, the content stack comprising the set of content items; and
- modify at least one content item of the set of content items based on inputs from the client device.

14. The system of claim 8, wherein the instructions, when executed by the at least one processor, further cause the system to:
- generate a personalization profile for a user of the user account; and
- associate the personalization profile with a new user account of the content management system.

15. A non-transitory computer-readable storage medium comprising instructions that, when executed by at least one processor, cause a computing device to:
- determine, from a plurality of content items associated with a user account of a content management system, content-based signals indicating relationships between the plurality of content items;
- determine, for the user account of the content management system, account-based signals indicating access patterns of the user account with the plurality of content items;
- generate, based on the content-based signals and the account-based signals, a stack formulation graph comprising:
  - nodes representing the plurality of content items; and
  - edges representing relationships of the plurality of content items;
- determine comparison metrics between at least a portion of the nodes of the stack formulation graph and a topic prompt; and
- generate a content stack comprising a set of content items corresponding to nodes having comparison metrics satisfying a similarity threshold.

16. The non-transitory computer-readable storage medium of claim 15, wherein generating the stack formulation graph comprises utilizing a machine-learning model to determine the relationships of the plurality of content items.

17. The non-transitory computer-readable storage medium of claim 15, wherein determining the comparison metrics comprises determining a cosine distance between the topic prompt and a topic feature vector representing a node of the stack formulation graph.

18. The non-transitory computer-readable storage medium of claim 15, wherein generating the content stack comprises determining a cluster of nodes separated by edges having lengths shorter than a threshold length.

19. The non-transitory computer-readable storage medium of claim 15, wherein the instructions, when executed by the at least one processor, further cause the computing device to:
- provide a copy of the set of content items in the content stack to a client device associated with the user account; and
- modify at least one content item of the set of content items based on inputs from the client device.

20. The non-transitory computer-readable storage medium of claim 15, wherein the instructions, when executed by the at least one processor, further cause the computing device to:
- determine, based on at least one of a change in the relationships between the plurality of content items or a change in the access patterns of the user account with the plurality of content items, an update to at least one of the content-based signals or the account-based signals;
- generate, based on the update to the at least one of the content-based signals or the account-based signals, an updated stack formulation graph comprising at least some of the nodes of the stack formulation graph;
- determine new comparison metrics between at least a portion of the nodes of the updated stack formulation graph and the topic prompt; and
- modify the content stack based on the new comparison metrics.

* * * * *